(12) United States Patent
Jin (10) Patent No.: US 11,093,969 B2
(45) Date of Patent: Aug. 17, 2021

(54) CROSS-DOMAIN CONTEXTUAL TARGETING WITHOUT ANY IN-DOMAIN LABELLED DATA

(71) Applicant: Knorex Pte. Ltd., Singapore (SG)

(72) Inventor: Yiping Jin, Singapore (SG)

(73) Assignee: KNOREX PTE. LTD., Singapore (SG)

( * ) Notice: Subject to any disclaimer, the term of this patent is extended or adjusted under 35 U.S.C. 154(b) by 0 days.

(21) Appl. No.: 17/033,020

(22) Filed: Sep. 25, 2020

(65) Prior Publication Data

US 2021/0097571 A1    Apr. 1, 2021

Related U.S. Application Data

(60) Provisional application No. 62/907,425, filed on Sep. 27, 2019.

(51) Int. Cl.
| | |
|---|---|
| *G06Q 30/00* | (2012.01) |
| *G06Q 30/02* | (2012.01) |
| *G06F 16/951* | (2019.01) |
| *G06N 20/00* | (2019.01) |
| *G06F 40/20* | (2020.01) |
| *G06F 9/54* | (2006.01) |
| *G06Q 50/00* | (2012.01) |

(52) U.S. Cl.
CPC ......... *G06Q 30/0254* (2013.01); *G06F 9/547* (2013.01); *G06F 16/951* (2019.01); *G06F 40/20* (2020.01); *G06N 20/00* (2019.01); *G06Q 50/01* (2013.01)

(58) Field of Classification Search
None
See application file for complete search history.

(56) References Cited

U.S. PATENT DOCUMENTS

| 10,275,516 | B2 * | 4/2019 | King ..................... G06F 16/332 |
| 10,404,745 | B2 * | 9/2019 | Verma ................. H04L 63/1483 |
| 10,678,816 | B2 * | 6/2020 | Peng .................... G06F 16/3329 |
| 2016/0224662 | A1 * | 8/2016 | King ..................... G06F 16/332 |
| 2016/0344770 | A1 * | 11/2016 | Verma .................... G06N 20/00 |
| 2019/0065576 | A1 * | 2/2019 | Peng ........................ G06F 16/22 |
| 2020/0133967 | A1 * | 4/2020 | Shukla ................ G06F 16/9538 |
| 2020/0242170 | A1 * | 7/2020 | Pogrebezky .......... G06F 16/986 |
| 2020/0242171 | A1 * | 7/2020 | Pogrebezky ........... G06N 5/003 |

(Continued)

OTHER PUBLICATIONS

Kaneko, Takuhiro, and Tatsuya Harada. "Label-Noise Robust Multi-Domain Image-to-Image Translation." arXiv preprint arXiv: 1905.02185 (2019). (Year: 2019).*

(Continued)

*Primary Examiner* — Farhan M Syed
(74) *Attorney, Agent, or Firm* — Procopio, Cory, Hargreaves & Savitch LLP (57) ABSTRACT

A computer-implementation method for dataless contextual targeting includes the following steps. First, automatically crawling noisy labeled corpora from one or more sites using a category mapping from first categories to second categories. Second, applying one or more statistical methods to automatically mine representative keywords for each of the first categories from the noisy labeled corpora. Applying dataless classification learning to induce a text classifier with the automatically mined representative keywords and unlabeled web pages as input.

23 Claims, 9 Drawing Sheets

(56) References Cited

U.S. PATENT DOCUMENTS

| | | | |
|---|---|---|---|
| 2020/0242533 A1* | 7/2020 | Pogrebezky | G06F 16/951 |
| 2020/0242632 A1* | 7/2020 | Pogrebezky | G06F 16/951 |
| 2020/0242633 A1* | 7/2020 | Pogrebezky | G06F 16/951 |
| 2020/0242634 A1* | 7/2020 | Pogrebezky | G06F 16/951 |
| 2020/0242635 A1* | 7/2020 | Pogrebezky | G06Q 10/06393 |

OTHER PUBLICATIONS

Bootkrajang, Jakramate, and Ata Kabán. "Label-noise robust logistic regression and its applications." In Joint European conference on machine learning and knowledge discovery in databases, pp. 143-158. Springer, Berlin, Heidelberg, 2012. (Year: 2012).*

Frénay, Benoît, and Michel Verleysen. "Classification in the presence of label noise: a survey." IEEE transactions on neural networks and learning systems 25, No. 5 (2013): 845-869. (Year: 2013).*

Carbonell, J. et al. "The Use of MMR, Diversity-Based Reranking for Reordering Documents and Producing Summaries" In SIGIR, 1998, pp. 335-336, vol. 98.

Chang, M-W. et al. "Importance of Semantic Representation: Dataless Classification" In AAAI 2008, pp. 830-835, vol. 2.

Druck, G.et al. "Learning from Labeled Features using Generalized Expectation Criteria" In Proceedings of the 31st Annual International ACM SIGIR Conference on Research and Development in Information Retrieval, Jul. 20-24, 2008, pp. 595-602.

Jin, Y. et al. "Combining Lightly-Supervised Text Classification Models for Accurate Contextual Advertising" In Proceedings of the Eighth International Joint Conference on Natural Language Processing, Nov. 27-Dec. 1, 2017, pp. 545-554.

Li, C. et al. "Effective Document Labeling with Very Few Seed Words: A Topic Modeling Approach" In Proceedings of the 25th ACM International on Conference on Information and Knowledge Management, Oct. 24-28, 2016, pp. 85-94, Indianapolis, IN, USA.

Nguyen-Hoang, B.-D., et al. "Genre-Oriented Web Content Extraction with Deep Convolutional Neural Networks and Statistical Methods" In Proceedings of the 32nd Pacific Asia Conference on Language, Information and Computation, Dec. 1-3, 2018, pp. 476-485.

"IAB internet advertising revenue report 2018 full year results" https://www.iab.com/insights/iab-internet-advertising-revenue-report-2018-full-year-results/. Accessed on Aug. 23, 2019. (32 pages).

Marshall, Jack "WTF is Programmatic Advertising?" Feb. 20, 2014, https://digiday.com/media/what-is-programmatic-advertising/. Accessed on Aug. 23, 2019. (2 pages).

"Content Taxonomy Mapping" final release Nov. 2017; https://www.iab.com/guidelines/iab-quality-assurance-guidelines-qag-taxonomy/. Accessed on Aug. 23, 2019.

"Web Directory of High-quality Resources" odp.org (2 pages).

DBpedia wiki.dbpedia.org. (2 pages).

Jin, Y. et al. "Learning from Noisy Out-of-Domain Corpus Using Dataless Classification" in Natural Language Engineering, 2020, pp. 1-31.

Davies, Jessica "'Personalization diminished': In the GDPR era, contextual targeting is making a comeback" Jun. 7, 2018, https://digiday.com/media/personalization-diminished-gdpr-era-contextual (3 pages).

* cited by examiner

ENGLISH   ESPAÑOL   中文

The New York Times

Business   Opinion   Tech   Science   Health   Sports   Arts   Books   Style   Food   Travel   Magazine

FIG. 5

600 https://www.nytimes.com/2019/07/01/sports/cori-gauff-venus-williams-wimbledon.html
　　　　domain　　　　　date　　category　　　(truncated) title

CROSS-DOMAIN CONTEXTUAL TARGETING WITHOUT ANY IN-DOMAIN LABELLED DATA

CROSS-REFERENCE TO RELATED APPLICATIONS

The present application claims priority to U.S. provisional patent application Ser. No. 62/907,425, filed on Sep. 27, 2019. The entire disclosure is included herein in its entirety at least by reference.

BACKGROUND

1 Technical Field

The example implementations relate to the field of data processing and more particularly to improved methods and systems for targeted content delivery.

2 Related Art

Targeted and personalized advertising content to Internet users may be associated with content and service providers; associated revenues for full year 2018 surpassed $100 billion, with a 21.8% increase over the previous year. There are several effective targeting strategies such as contextual targeting (targeting the page content), language targeting (targeting the native language of the user) and location targeting (targeting users in a specific geographic area).

Related art programmatic advertising refers to the use of software to buy digital advertising, as opposed to negotiating with publishers (owners of web pages) and manually purchasing ad slots. Programmatic advertising enables evaluation of the value and relevancy of each ad impression (opportunity to display content associated with a product or service) with the aid of software powered by artificial intelligence (AI). It also introduces centralized brokers such as ad exchanges and ad networks, where purchase impressions may be purchased without having to connect to individual publishers.

The example implementations focus on contextual advertising, configured to display ads on only web pages which are related to the ad. The web content needs to be classified into the category taxonomy defined by Interactive Advertising Bureau (IAB), the organization which develops industry standards for online advertising to facilitate the integration with various ad exchanges and publishers. The taxonomy consists of twenty-three tier-1 categories and more than 300 tier-2 categories. It covers a broad range of sectors such as automotive, education, and travel. The large number of categories, and the heterogeneous content on the Internet, together pose a great challenge to build and maintain highly accurate text classifiers.

There are a number of related art solutions for contextual targeting. Some of these related art solutions attempt to match the pages which contain specific keywords. However, these solutions fail to meet the requirements of the industry because they lack page content analysis and have poor accuracy. Other related art solutions attempt to apply supervised machine learning classifiers. However, these solutions are similarly unable to meet the requirements of the industry because they require large amount of labeled documents and they do not perform well on different types of web content. Thus, there is an unmet need to provide contextual targeting that has page content analysis, accuracy and can be applied to different types of web content.

3 SUMMARY

In one example implementation, a computer-implementation method for dataless contextual targeting is provided, comprising (a) automatically crawling noisy labeled corpora from one or more sites using a category mapping from first a category to a second category, (b) applying one or more statistical methods to automatically mine representative keywords for the first category from the noisy labeled corpora, and (c) applying dataless classification learning to induce a text classifier with the automatically mined representative keywords and unlabeled web pages as input.

In another example implementation, labels for news articles are obtained by either applying regular expressions on the page URL, or by crawling categorized archive pages. In another one example implementation, the textual content of a web page is extracted and cleansed with a combination of procedures, including downloading HTML source, web page type detection, boilerplate removal, main textual content extraction and language detection. In yet another example implementation, keywords are mined using statistical methods from noisy automatically labeled dataset. In still another example implementation, automatically mined keywords and unlabeled in-domain documents are utilized to induce cross-domain text classifiers.

In another aspect, a computer-implemented system for building contextual targeting models without labeled documents is provided, comprising a scalable and extendable crawler to periodically crawl <category, content> tuples from various news websites at a low latency, a scalable and low-latency database to store the crawled category and content which facilitates fast writing and reading operations, a data pipeline to stream unlabeled in-domain data to form a dataset which is used to induce dataless classifiers, a pipeline to fetch required keywords and unlabeled in-domain dataset and trigger the training of dataless classifiers, and a web service to host the induced dataless classifier and provide web APIs to end applications.

Also in an example implementation, the list of websites with associated regular expressions and categorized archive pages can be updated to support new websites. In another example implementation, the article database is scalable and can store millions of <category, content> tuples and facilitate fast querying and grouping of documents based on the category. Also in another example implementation, in-domain data stream is processed and transformed with low latency to append to the in-domain dataset. Also in one example implementation, multiple training tasks can be performed in parallel to induce classifiers with different sets of keywords and datasets.

4 BRIEF DESCRIPTION OF THE FIGURES

The example implementations and the following detailed description of certain example implementations thereof may be understood by reference to the following figures.

5 DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. Example implementations as described herein can be utilized either singularly or in combination and the functionality of the example implementations can be implemented through any means according to the desired implementations.

Figure 1:
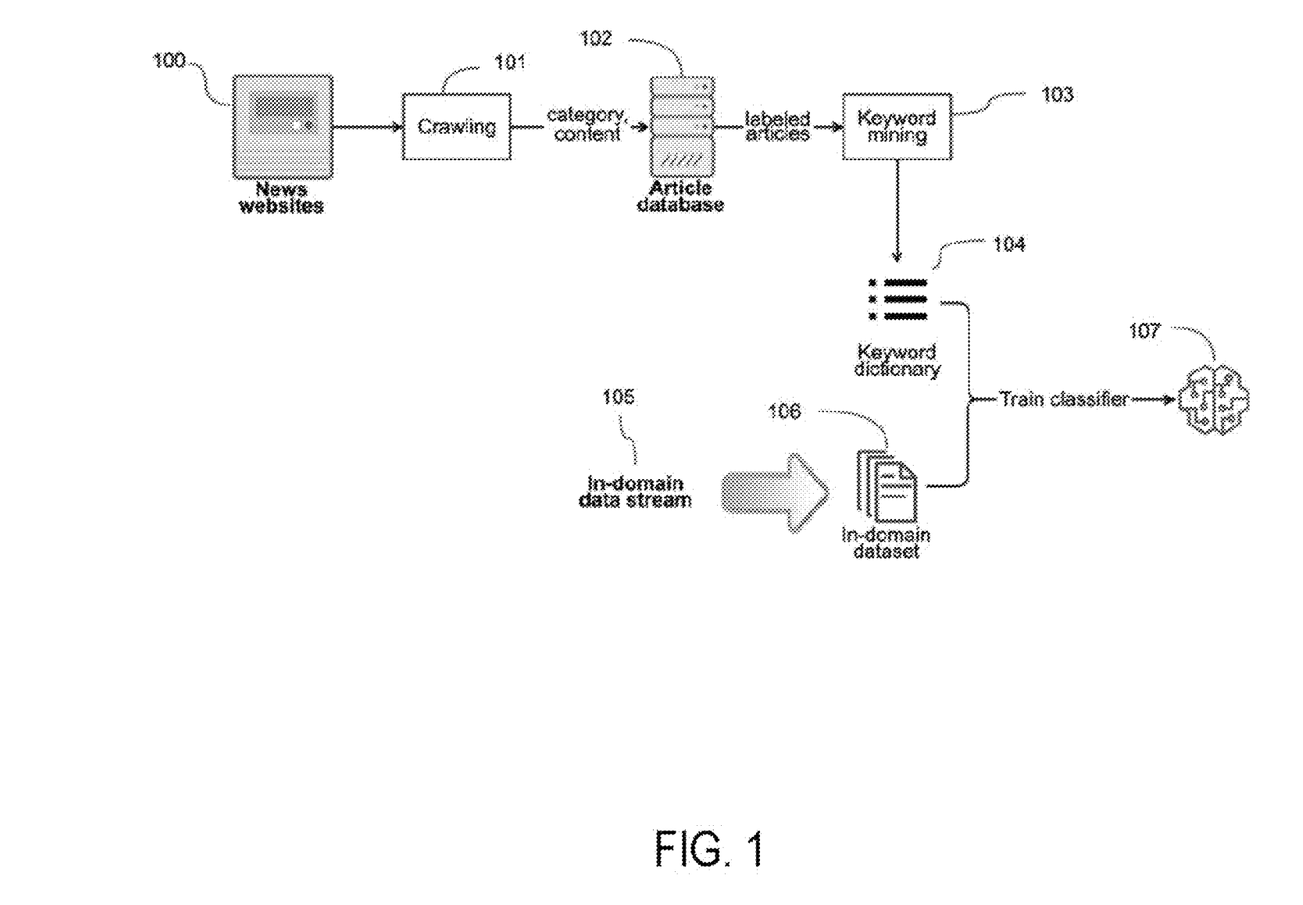
FIG. 1 is a flow chart summarizing the process to induce classifiers according to an example implementation.

FIG. 1 is a flow chart summarizing the process to induce classifiers according to an example implementation. News website 100 represents a news website whose content is categorized into various topics supporting practice according to several different example implementations. However, the example implementations are not limited to news websites, and other content websites of other types may be substituted therefor without department from the inventive scope. In this example implementation, a crawler 101 is utilized to extract the textual content and the category of web pages in website 100. The extracted <category, content> tuples are stored in an article database 102. Database 102 can be implemented using a relational database, NoSQL database or other format such as plain text files without altering this example implementation.

Subsequently, the <category, content> tuples stored in database 102 are fetched and utilized to mine keywords with a keyword mining algorithm 103. The automatically mined keywords are stored in a keyword dictionary 104.

An in-domain data stream 105 represents a stream of application data on which a classifier 107 is applied. Data stream 105 is processed and transformed to construct an in-domain dataset 106, which is used in conjunction with keyword dictionary 104 to induce classifier 107. Subsequent subsections provide further details regarding each sub-step in an example implementation.

5.1 Crawling Labeled Corpus from Newswire Sites

Figure 2:
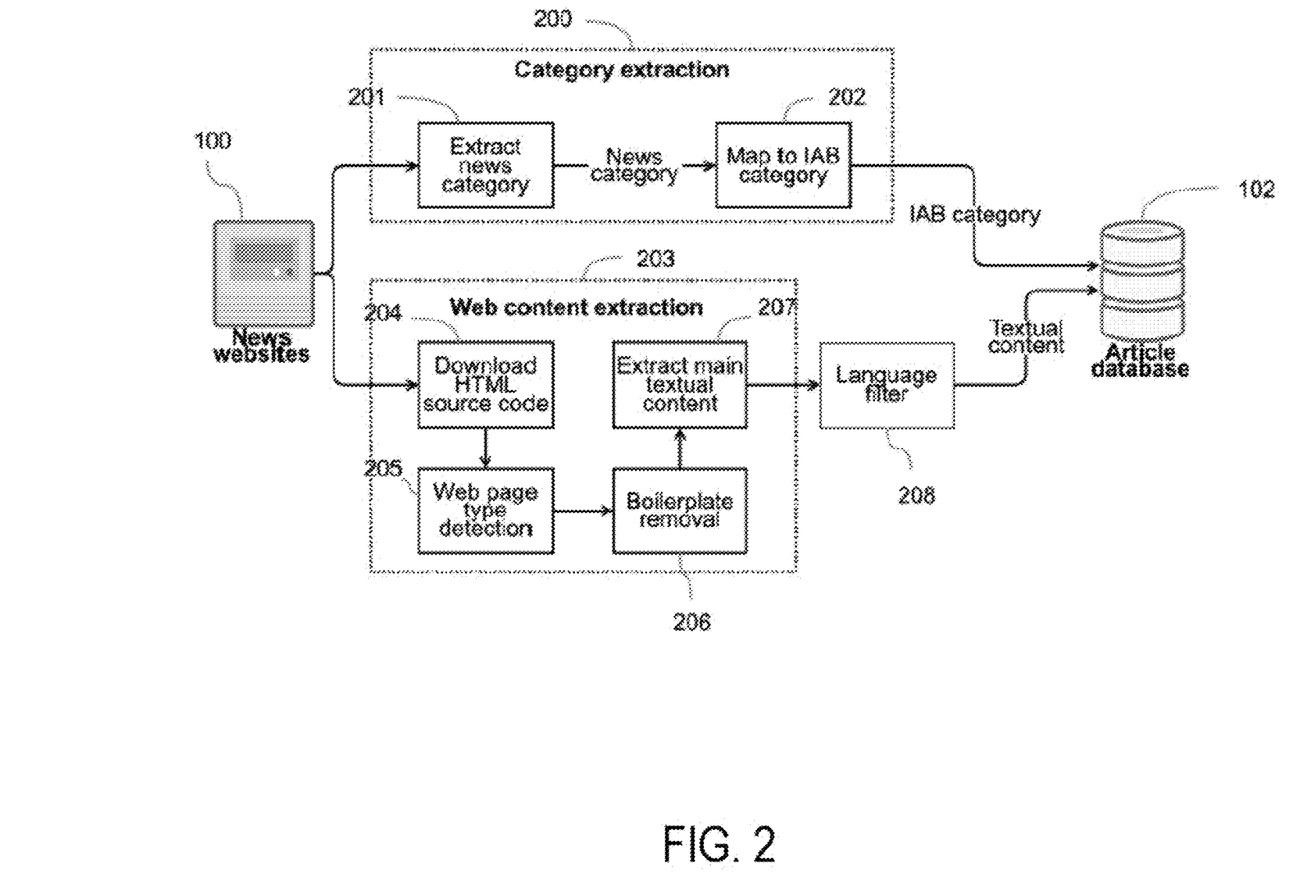
FIG. 2 illustrates the process to crawl labeled corpus from newswire sites automatically according to an example implementation.

FIG. 2 illustrates the detailed process to crawl labeled corpus from news websites 100 automatically. It corresponds to the high-level crawling process 101 in FIG. 1. The crawling process can be further divided into two independent subtasks: automatically extracting the category label 200 and extracting the web page content 203. The details are illustrated as follows.

5.1.1 Automatically Extracting the Category Label

Figure 5:
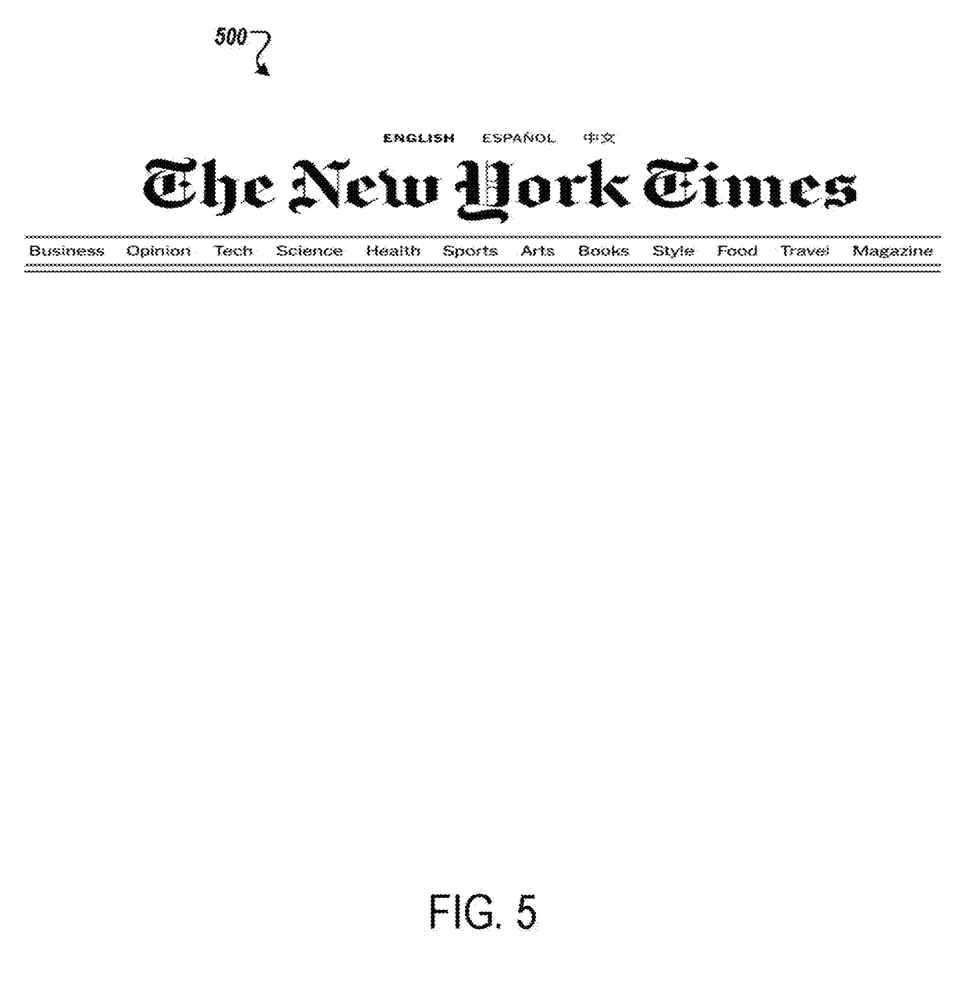
FIG. 5 shows a screenshot from The New York Times homepage.

This section describes the process to extract the labels for web pages 200 automatically without performing manual labeling, which is illustrated in the upper part of FIG. 2. Many websites, including but not limited to newswire sites, categorize their content into a list of categories (e.g. predefined categories). An example is shown in FIG. 5 at 500.

Figure 6:
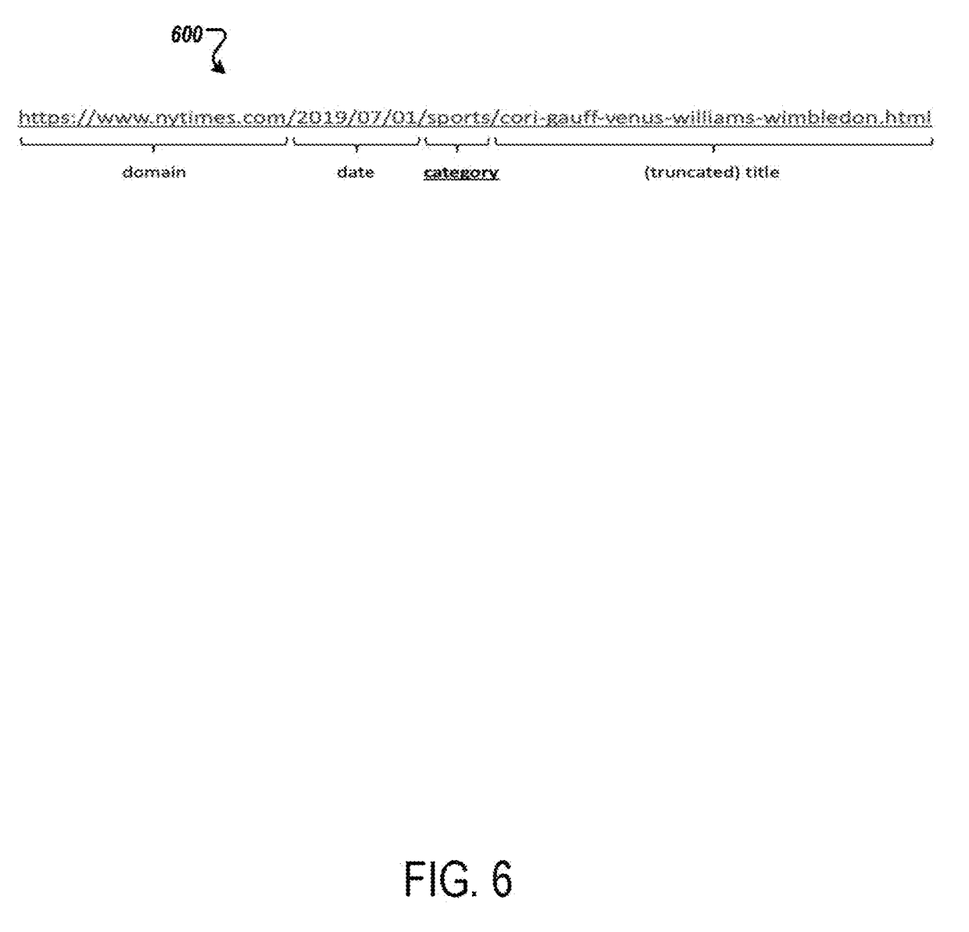
FIG. 6 shows a sample URL and its different components, which can be used to extract the news category.

Two news category extraction techniques 201 are applied to extract the news category for a page. The first one is to apply regular expression on the page's uniform resource locator (URL). This technique is applicable in the case where the news website explicitly encodes the category name in the URL like in FIG. 6 at 600. An example of a regular expression is shown in Table 1.

TABLE 1

Sample regular expression to extract the category of news articles.

| Regular Expression for URL | Category |
|---|---|
| nytimes.com/([^/][0-9]*)/([^/][0-9]*)/([^/][0-9]*)/ (arts—books—movies—theater) | Arts & Entertainment |
| pethelpful.com/(rabbits—dogs—birds—cats—misc) | Pets |

The second strategy is to crawl a list of URLs from a categorized archive page, such as www.reuters.com/news/archive/entertainmentNews and https://www.dw.com/en/auto-industry/t-17282970.

A mapping from each news category to the corresponding IAB category 202 is created, which is used to translate the label to IAB taxonomy. To create the mapping, word stemming is performed to normalize the category names in both IAB taxonomy and various news sites. Stemming removes the suffixes from words. E.g., both "technology" and "technological" are stemmed to the form "technolog". While stemming does not guarantee to return a proper word (e.g. technolog), it helps to reduce the variation of words with the same root. Subsequently, Jaro-Winkler string distance is calculated between each stemmed news category to all IAB categories. If the similarity is higher than a predefined threshold, the news category will be automatically mapped to the most similar IAB category. To ensure the quality of the mapping, a manual curation is performed. While curating the category mapping 202 takes time, it allows for the crawling of hundreds of thousands of documents with automatically assigned labels.

Additionally, the following rule base is provided for creating the mapping from the news category to the IAB category when one category includes the other.

If the IAB category name includes the news category name (or its stemmed form), a mapping shall be created;

If the news category name includes the IAB category name (or its stemmed form) and not vice versa, a mapping shall NOT be created;

To illustrate the two cases, suppose the news category is more specific than the IAB category (e.g., news category: "parenting", IAB category: "family & parenting"), then a document belonging to the news category implies that it belongs to the IAB category. Therefore, a mapping shall be created. On the other hand, if the news category is broader than the IAB category (e.g., news category: "politics and international news", IAB category: "politics"), then a document belonging to the news category does not imply that it belongs to the IAB category. Therefore, a mapping shall not be created to avoid introducing noise.

5.1.2 Automatically Extracting the Web Page Content

This section describes a web content extraction process 203, which is illustrated in the lower part of FIG. 2.

First, the HTML source code 204 is downloaded by sending an HTTP GET request to the URL of the web page. Then a web page type detection model 205 (Nguyen-Hoang et al. (2018)) is applied to determine the type of the web page (e.g., news article page, list or forum page). Based on the type of the web page, different boilerplate removal methods 206, such as detecting the main body of text or detecting text chunks appearing in a parallel structure, are applied to remove the HTML tags, JavaScript and other noisy content in the HTML page. Lastly, the main textual content of the page 207 is identified by extracting the longest consecutive chunk of text. The main content extraction step 207 is essential since many articles on the Internet contains unrelated content such as sidebars and user comments. Maintaining these contents in the extracted text will introduce noise to the subsequent statistical and machine learning procedure.

5.1.3 Filter Documents Based on Language

After extracting the textual content from the web page 100 (hereafter referred to as "document" and collectively as "corpus"), a language detection model 208 is applied to detect its primary language. Only the documents in the desired language are retained to train the text classifier.

The language detection model 208 is built using a Naïve Bayes classifier, specifically, the probability for language $L_k$ given document d is calculated as:

$$p(L_k | d) = \frac{p(L_k)p(d | L_k)}{p(d)} \quad (1)$$

The denominator can be ignored during classification because it does not depend on the language to predict. Based on Naïve Bayes assumption, the probability of the occurrence of each word $w_i$ is independent from each other. Therefore:

$$p(d | L_k) = \prod_i p(w_i | L_k) \quad (2)$$

Based on Equation 1 and 2, $$p(L_k | d) \propto p(L_k) \prod_i p(w_i | L_k) \quad (3)$$

The whole Wikipedia dump is used to estimate the two parameters in Equation 3: $p(L_k)$ and $p(w_i|L_k)$. For language $L_k$, $p(L_k)$ is estimated as the number of Wikipedia articles in language $L_k$ divided by the total number of Wikipedia articles in any language. $p(w_i|L_k)$ is estimated as the occurrence of word $w_i$ within language $L_k$ divided by the total word count for language $L_k$. While the present example implementations refer to Wikipedia, other multi-lingual corpus containing sizeable (e.g., hundreds of thousands) documents for each of the languages (e.g., more than one hundred languages) may be used in combination or substitution therefor.

For a given document d, $p(L_k|d)$ is calculated for all languages and L* is predicted based on the highest posterior probability $p(L_k|d)$ as the language of the document.

After the category and the content are both extracted after an example procedure such as 200 and 203, the categorized documents are stored in the article database 102.

5.2 Mining Keywords From (Noisy) Labelled Corpora

Figure 3:
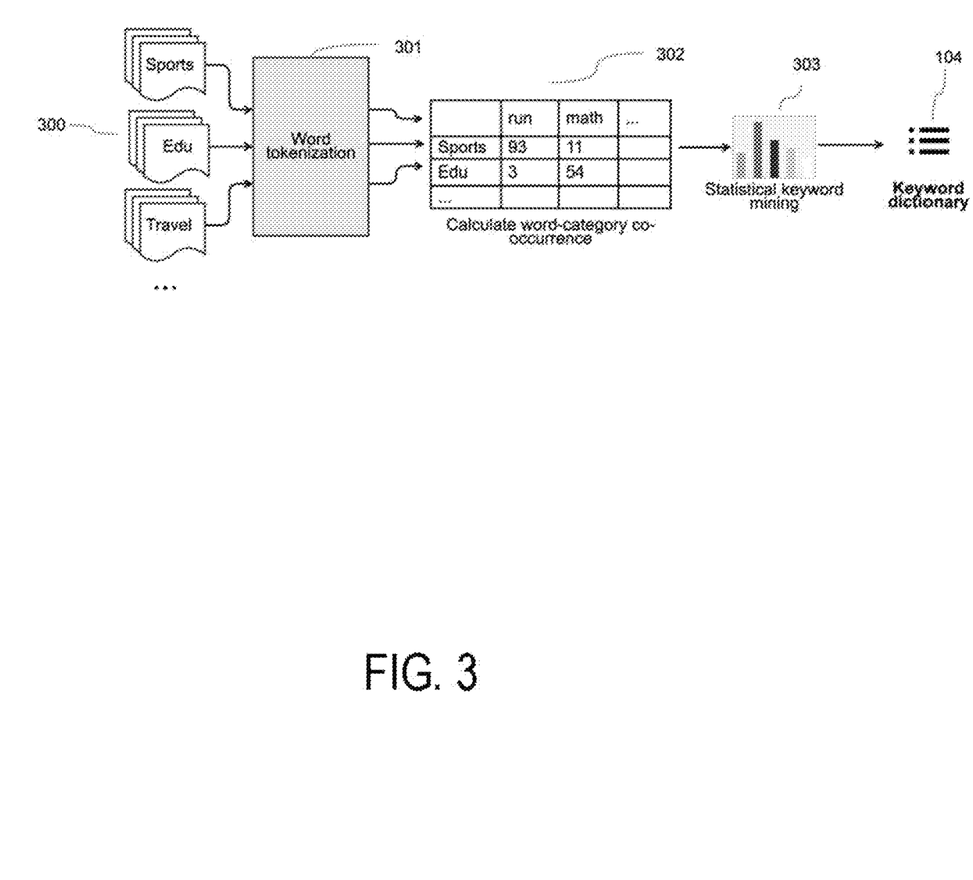
FIG. 3 illustrates the process to mine keywords from the labeled corpus using statistical methods according to an example implementation.

FIG. 3 illustrates the process to mine keywords 103 from the labeled corpus 300 using statistical methods. The labeled corpus 300 includes labeled documents stored in the article database 102 through the procedure described in Section 5.1. The keyword mining algorithm 103 further divides into three subtasks.

Firstly, word tokenization 301 is applied to the textual corpus created following the method described in Subsection 5.1. The output is a list of tokens (words) for each input document.

Secondly, the co-occurrence count between each word and category pair 302 is collected. To efficiently calculate the co-occurrence, a counter for each category is maintained, where the key is each word in the vocabulary, and the value is the number of documents the word appears. A global counter is also maintained to collect statistics required in the subsequently described procedures.

Further, statistical methods 303 are applied to mine salient keywords for each category based on their occurrence pattern. To formally define the keyword mining task 103: given a corpus $(D_1, \ldots, D_C)$ 300, where $D_c = (d_1, \ldots, d_k)$ is the set of documents labelled as category c. Each document $d_i$ contains a list of terms $(w_1, \ldots w_l)$. The goal is to generate a list of representative terms $t_1, \ldots, t_n$ (also known as the keyword dictionary 104) from the vocabulary $V = [w_1, \ldots w_N]$ for each category. The task is related to the measurement of association in information theory. Therefore, the pointwise mutual information between keyword w and category c is applied. pmi(w; c) is defined as follows:

$$pmi(w; c) \equiv \log \frac{p(w, c)}{p(w)p(c)} \propto \log \frac{df(w, c)}{df(w)df(c)} \quad (4)$$

It is noted that pmi tends to favor rare words. For example, when a word occurs only once in the corpus, it will have a high pmi score in the category where it occurs. This makes the mined keywords unreliable, especially in the presence of the label noise. Therefore, pmi-freq is introduced with two modifications: firstly, the pmi score is multiplied by the logarithmic term frequency of word w. Secondly, a threshold of minimum term frequency of 5 is set. The pmi-freq will be set to zero if the term frequency is below the threshold.

$$pmi\text{-}freq(w; c) = \begin{cases} \log df(w) \log \frac{df(w, c)}{df(w)df(c)}, & \text{if } df(w) \geq 5 \\ 0, & \text{otherwise} \end{cases}$$

While pmi may ensure that there is a strong association between the top keywords and the category, it is desirable that the keywords for different categories have little or no overlap. Therefore, maximal marginal relevance (MMR) (Carbonell and Goldstein (1998)) is applied.

$$mmr \equiv \arg\max_{w_i \in S_{cm}} \left[ \lambda Sim_1(w_i, c_m) - (1-\lambda) \max_{w_j \in S_{cn} \& m \neq n} Sim_2(w_i, w_j) \right] \quad (5)$$

In Equation 5, the first term measures the similarity between candidate word $w_i$ and category $c_m$. The second term measures the maximum similarity between candidate word $w_i$ and any seed word from another category $c_n$. The parameter λ controls the weights of the two terms. A higher λ favors keywords that are strongly associated with category $c_m$. A smaller λ favors keywords that occur exclusively in category $c_m$ but not in other categories. A default λ of 0.5 and pmi-freq as the similarity measure for both $Sim_1$ and $Sim_2$ are used.

The mmr score is used to rank all the words for each category and the top K keywords are selected as seed words for that category.

5.3 Inducing Text Classifiers from Keywords and Unlabeled Documents

Figure 4:
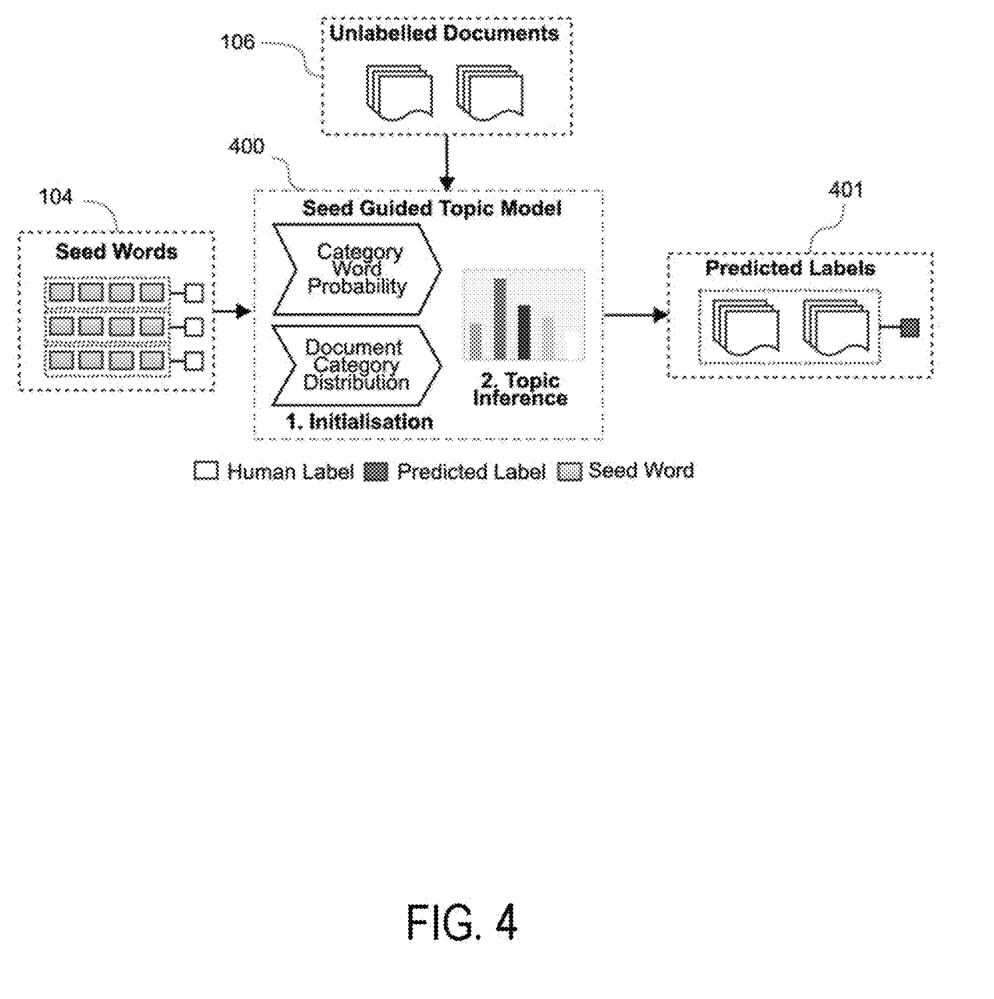
FIG. 4 illustrates the process to induce a classifier from automatically mined keywords and unlabeled in-domain data according to an example implementation.

The Seed-Guided Topic Model (STM) 400 (Li et al. (2016)) is applied to train dataless classifiers 107. The architecture of STM 400 is depicted in FIG. 4. STM 400 takes labeled seed words 104 and unlabeled in-domain documents 106 as input. The labeled seed words 104 are automatically mined using the process described in Subsection 5.2. While labeled documents are expensive to obtain, unlabeled documents 106 are often available in abundance. Therefore, the present example implementations may offer the possibility to apply the learning algorithm on unlabeled in-domain documents 106, such as Twitter or online forum data.

In the first step, the initial document category distribution is estimated from the term frequency of seed words with a Dirichlet smoothing prior. It also calculates the category word probability of unlabeled words based on their co-occurrence with the labeled seed words as follows:

The conditional probability p(w|s) is first calculated using Equation 6, where d f(w, s) is the number of the documents containing both unlabeled word w and seed word s. The relevance of word w to category c is then calculated as the average conditional probability of w with respect to each seed word in $S_c$ (Equation 7).

$$p(w|s) = \frac{df(w, s)}{df(s)} \quad (6)$$

$$rel(w, c) = \frac{1}{|S_c|} \sum_{s \in S_c} p(w|s) \quad (7)$$

Next, the relevance score is normalized by summing over each category c and each word w in the vocabulary in Equation 8 and Equation 9 respectively. The final $v_c$ values are used to initialize the category word probability before the inference process.

$$v(w, c) = \max\left(\frac{rel(w, c)}{\sum_c rel(w, c)} - \frac{1}{c}, 0\right) \quad (8)$$

$$v_c(w, c) = \frac{v(w, c)}{\sum_w v(w, c)} \quad (9)$$

The model differentiates two types of underlying topics: the category-topic and the general-topic. General-topics capture the global semantic information and are shared by all the documents. A category-topic is associated with a single category and captures the relevant keywords of the category. STM model 400 introduces a binary variable $x_{d,i}$ which indicates whether the associated word $w_{d,i}$ is generated from document d's category-topic $c_d$ or from one of the general-topics. The parameter inference is carried out using Gibbs Sampling, and the generative process is described below:

1. For each category $c \in \{1 \ldots C\}$
   (a) draw a general-topic distribution $\varphi \sim \text{Dirichlet}(\alpha_0)$;
   (b) draw a category word distribution $\vartheta \sim \text{Dirichlet}(\beta_0)$.
2. For each general-topic $t \in \{1 \ldots T\}$:
   (a) draw a word distribution for the general-topic $\phi_t \sim \text{Dirichlet}(\beta_1)$;
3. For each document $d \in \{1 \ldots D\}$:
   (a) generate an initial category distribution $\eta_d$;
   (b) draw category $c_d \sim \text{Multinomial}(\eta_d)$;
   (c) draw a general-topic distribution $\theta_d \sim \text{Dirichlet}(\alpha_1 \cdot \varphi_{c_d})$;
   (d) for each word $i \in \{1 \ldots |d|\}$:
      i. draw $x_{d,i} \sim \text{Bernoulli}(\delta_{w_{d,i}, c_d})$;
      ii. if $x_{d,i} = 0$: draw word $w_{d,i} \sim \text{Multinomial}(\vartheta_{c_d})$;
      if $x_{d,i} = 1$:
         A. draw general-topic assignment $z_{d,i} \sim \text{Multinomial}(\theta_d)$;
         B. draw word $w_{d,i} \sim \varphi_{z_{d,i}}$;

During the training/prediction, the model first jointly samples each pair of $x_{d,i}$ and $z_{d,i}$ conditioned on every possible category c. The model then estimates the conditional probability distribution $p(c_d = c | z, x, c_{\neg d}, w)$, where ¬d denotes the collection of documents excluding document d.

The STM model 400 has according to the example implementations may have two main advantages that may allow it to achieve high accuracy for dataless classification. Firstly, the model explicitly calculates the correlation of unlabeled words to the seed words 104 and uses the correlation to initialize the category word probability. Thus, the inference process may be easier compared to using a randomly initialized probability distribution. Secondly, by separating the topics into general-topics and category-topics, the model can focus on only the reliable signals and "skim-through" the rest of the document by assigning it to a general-topic.

The STM model 400 is applied with the keywords 104 mined using the algorithm described in Section 5.2 and a sizeable unlabeled corpus 106 to train the final classifier 107.

The related art STM model has a disadvantage that it does not differentiate the training and prediction stage. All the documents are initialized before the model training. After each iteration, the model samples the category 401 from the category probability distribution. Therefore, a document may be assigned to a different category in different iterations. This is desirable during the training phase because the model will not be stuck at the local minimum too fast. However, predicting different labels for the same input document may not be acceptable if the model is to be used in a real-world application. To address this problem, the example implementations sample the category 401 only during the training phase. During the prediction phase, argmax $p(c_d = c | z, x, c_{\neg d}, w)$ is predicted as the document category 401.

Compared to the work of Li et al. (2016), the primary distinction of this example implementation is that the seed words are automatically mined from a noisily labeled corpus. Li et al. (2016) used the label name and description as the seed words. Tapping on the labeled corpus, the example implementation may have a better starting point with more comprehensive seed words 104 and may converge more easily. Moreover, argmax is used to ensure the model predicts the same label given the same input document. Furthermore, the application of dataless classification methods to address the out-of-domain problem is novel. On the other hand, related art dataless classification methods are restricted to building classifiers without labeled documents, in a single domain.

6 HARDWARE REQUIREMENT

All experiments in the example implementations were conducted on a desktop computer with an Intel Core™ i5-8400 processor, 16 GB RAM, and 1 TB HDD. Crawling the corpus from online newswire sites 100 requires internet access while the rest of the steps can be performed offline. Training of the dataless classification model is the most resource-intensive step, which requires a minimum of 10 GB RAM. At least one CPU core is required while additional cores can yield speed up. While the foregoing hardware requirements are explained with respect to the present example implementations, these requirements may be substituted or combined with other hardware, as would be understood by those skilled in the art.

7 ALTERNATIVE EXAMPLE IMPLEMENTATIONS

While the foregoing example implementations are provided, the present inventive concept is not limited thereto, and other aspects may also be provided as follows.

In example implementations, the label of the crawled corpus in Section 5.1 may be obtained from a knowledge base (such as DBpedia) or a web directory (such as Open Directory Project.org) instead of from news categories. Thus, the example implementations are not limited to news categories.

The example implementations can be applied to other textual data besides web pages, such as scientific publications, and mobile applications.

The example implementations can be applied to languages other than English. All the steps in this example implementations are not language-specific. The only requirement is that each document can be mapped to a list of word IDs. Therefore, to extend the example implementations to another language, a word tokenizer for that language needs to be incorporated.

In example implementations, the keyword mining algorithm in Section 5.2 can use other statistical methods such as mutual information and $\chi 2$. However, these statistical methods will need to be adapted through experimentation because other adaptations or substitutions may be provided, due to the presence of label noise, including the foregoing example implementations.

In example implementations, when a noisy labeled corpus is not available, domain experts can compose the list of keywords manually, as an alternative approach.

In example implementations, in Section 5.3 other dataless classification learning methods can be used such as Chang et al. (2008).

It will be apparent to one with skill in the art that the cross-domain text classification method of the example implementations may be provided using some or all of the mentioned features and components without departing from the inventive scope. It will also be apparent to the skilled artisan that the example implementations described above are specific examples of a single broader example implementation which may have greater scope than any of the singular descriptions taught. There may be many alternations made in the descriptions without departing from the scope of the present inventive concept.

According to the example implementations, the subject matter described herein may be integrated into one or more approaches. For example, but not by way of limitation, the example implementations may be employed in an engine to provide advertising campaign automation and performance optimization. By applying the foregoing example implementations, the engine may analyze every advertising opportunity to deliver the right message to the right audience, at the right moment, and to pay the right price.

Further, optimization may be performed at scale with peak traffic of millions of advertising requests per second. Additional example implementations may involve the use of contextual advertising to categorize web pages into specific categories relevant to the product or service the advertisers provide. More specifically, the ad is ensured to be relevant to the page the user is browsing. Thus, contextual advertising may support "the right moment" and increase user receptivity to the advertising message.

The contextual advertising datasets that were crawled from news websites and search engines using keywords may have different characteristics from observed online advertising traffic. As a result of this issue of out-of-domain data, together with the potential mislabeling, related art contextual classifiers' accuracy may be suboptimal. To address this issue, the example implementation applies out-of-domain and imperfectly labeled datasets to induce a more accurate classification model, to classify web pages in a manner that supports the advertisers targeting their ads to the most relevant context.

For example but not by way of limitation, audience segmentation may be performed based on mobile application activity associated with a user. The ad content delivered to the user may be personalized in real-time based on the mobile application activities, user profiles, etc. to permit the generation of dynamic, on-the-fly ads the pull the out of domain information in a manner not done in the related art.

According to yet another example implementation, the aspects of automation, personalization, predictive analytics and recommendation may be integrated for budget allocation of an online ad campaign, based on the key performance indicators (KPIs). For example, optimization may be performed based on click-through rates, cost per click and/or cost per action. The recommendation may be a bidding strategy based on a match between keywords and the artificial intelligence aspects of the example implementations.

8 MARKET ANALYSIS

Targeted content delivery has surged in popularity because of its effectiveness in targeting specific audience and context. Targeted content delivery revenues for full year 2018 surpassed $100 billion, with a 21.8% increase over the previous year.

The introduction of the EU General Data Protection Regulation (GDPR) enforces restrictions on the tracking of user data and severely reduces the capability of personalized targeting. On the contrary, contextual targeting analyses the context of the web page that the user is browsing and does not involve personal data. Therefore, it is not affected by the restrictions of GDPR. Experts forecast that GDPR will force content providers who previously applied personalized audience targeting to turn to contextual targeting.

Traditionally, contextual targeting requires matching specific keywords on the web pages. However, shallow keyword matching without analyzing the page content often results in poor accuracy (Druck et al. (2008)). It would be desirable to have a process to build accurate classifiers without much manual effort. Furthermore, it would also be desirable to have a process that can adapt the classifier for different types of web content, such as news, forums, and social media. Therefore, there currently exists a need in the industry for a process that can induce accurate classifiers in a dataless manner. Dataless classification (Chang et al. (2008)) induces text classifiers with keywords and unlabeled documents. It does not require additional human labels than the traditional keyword-based contextual targeting and promises higher targeting accuracy (Jin et al. (2017)). Moreover, since unlabeled in-domain documents are prevalent, the classifier can be retrained with in-domain documents to achieve a better performance. Therefore, it has a high potential to be applied to real-world contextual targeting problem.

9 FURTHER DISCLOSURE OF THE EXAMPLE IMPLEMENTATIONS

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

The operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

Figure 7:
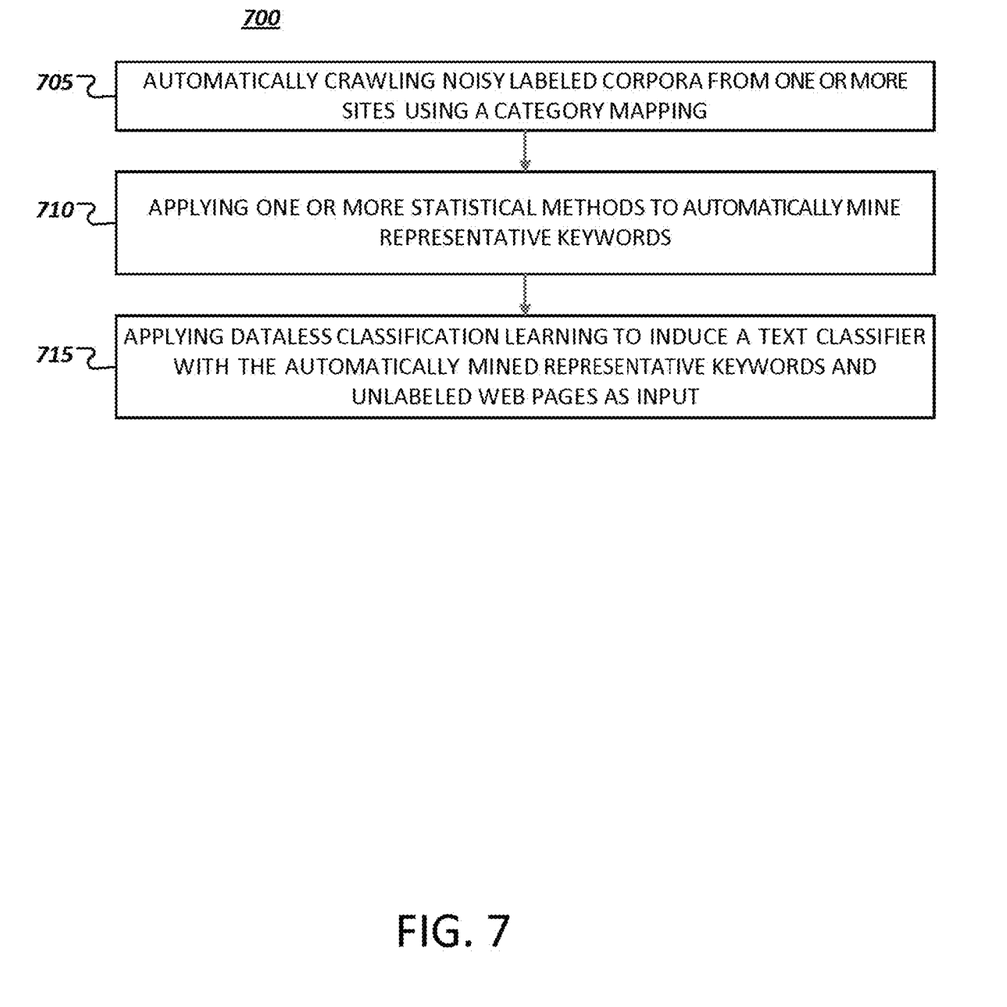
FIG. 7 illustrates a process according to the example implementations.

FIG. 7 is a a flowchart of an embodiment of a method for according to the disclosure. A method 700 can be implemented by one or more processors in a computing environment (e.g., the computing environment described below).

At 705, automatically crawling of noisy labeled corpora from one or more sites using a category mapping from a first category to a second category is performed.

At 710, applying one or more statistical methods to automatically mine representative keywords for the first category from the noisy labeled corpora is performed.

At 715. applying dataless classification learning to induce a text classifier with the automatically mined representative keywords and unlabeled web pages as input is performed.

Figure 8:
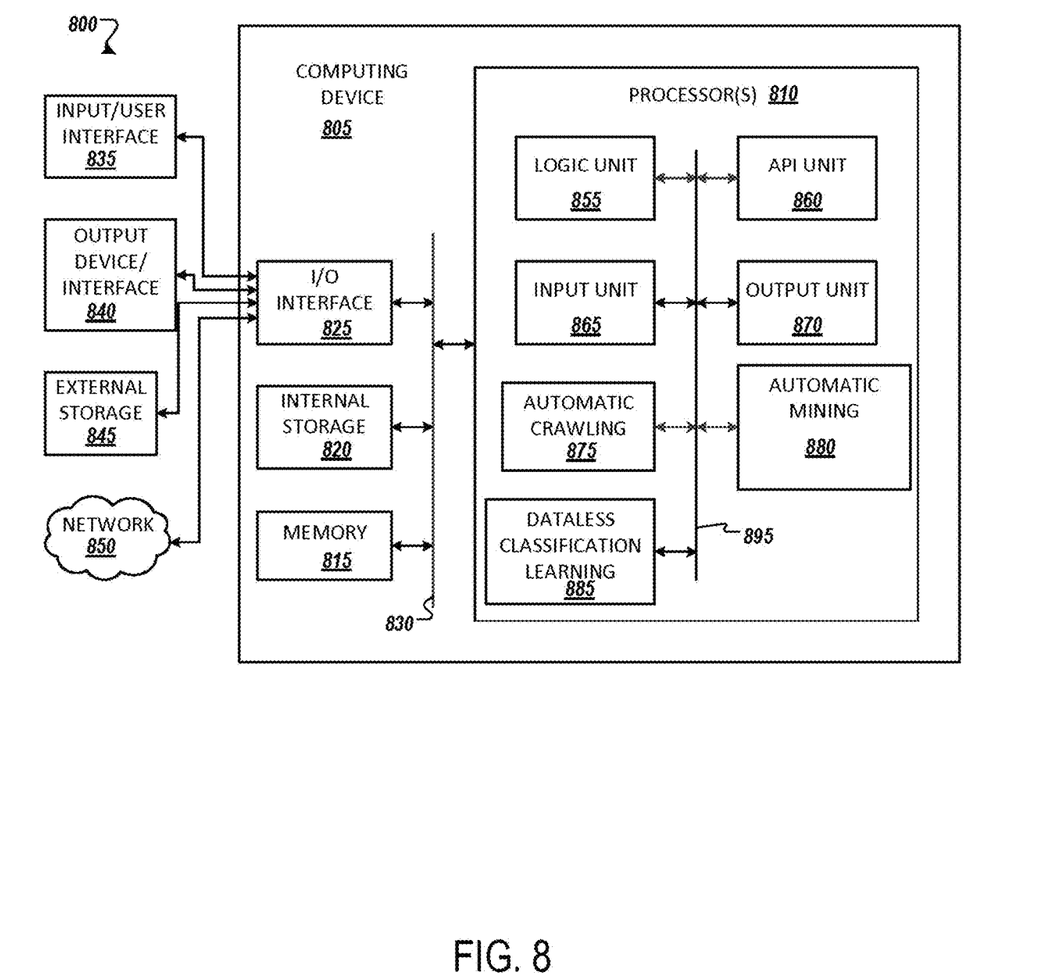
FIG. 8 illustrates a network according to the example implementations.

FIG. 8 is a functional block diagram of an embodiment of a computing environment according to the disclosure. A computing environment 800 with an example computer device 805 suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805. The environment 800 can support operations associated with the system 100, for example.

According to the present example implementations, the processing associated with the neural activity may occur on a processor 810 that is the central processing unit (CPU). Alternatively, other processors may be substituted therefor without departing from the inventive concept. For example, but not by way of limitation, and while not required for the reasons explained above, a graphics processing unit (GPU), and/or a neural processing unit (NPU) may be substituted for or used in combination with the CPU to perform the processing for the foregoing example implementations.

Computing device 805 can be communicatively coupled to input/interface 835 and output device/interface 840. Either one or both of input/interface 835 and output device/ interface 840 can be a wired or wireless interface and can be detachable. Input/interface 835 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 840 may include a display, television, monitor, printer, speaker, braille, or the like. In some example implementations, input/interface 835 (e.g., user interface) and output device/interface 840 can be embedded with, or physically coupled to, the computing device 805. In other example implementations, other computing devices may function as, or provide the functions of, an input/interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as, a server, client, thin server, general machine, special-purpose machine, or another label. For example but not by way of limitation, network 850 may include the blockchain network, and/or the cloud.

I/O interface 825 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, information automatic crawling unit 875, automatic mining unit 880, dataless classification learning unit 885, and inter-unit communication mechanism 895 for the different units (e.g., the encode 110 and the decoder 120) to communicate with each other, with the OS, and with other applications (not shown).

The information automatic crawling unit 875 can perform functions associated with receiving inputs, processing inputs, and obtaining further inputs. The automatic mining unit 880 can perform functions associated with the processing of the inputs to produce an output. The dataless classification learning unit 885 can generate outputs. These units may be implemented in hardware, software, or a combination of hardware and software (e.g., in a server or the like).

For example, the information automatic crawling unit 875, the automatic mining unit 880, and the dataless classification learning unit 885 may implement one or more processes shown above with respect to the structures described above in addition to the method 700. The described units and elements can be varied in design, function, configuration, or implementation and are not limited to the descriptions provided.

In some example implementations, when information or an execution instruction is received by API unit 860, it may be communicated to one or more other units (e.g., logic unit 855, input unit 865, information automatic crawling unit 875, automatic mining unit 880, and dataless classification learning unit 885).

In some instances, the logic unit 855 may be configured to control the information flow among the units and direct the services provided by API unit 860, input unit 865, information automatic crawling unit 875, automatic mining unit 880, and dataless classification learning unit 885 in some example implementations described above. For example, the flow of one or more processes or implementations may be controlled by logic unit 855 alone or in conjunction with API unit 860.

Figure 9:
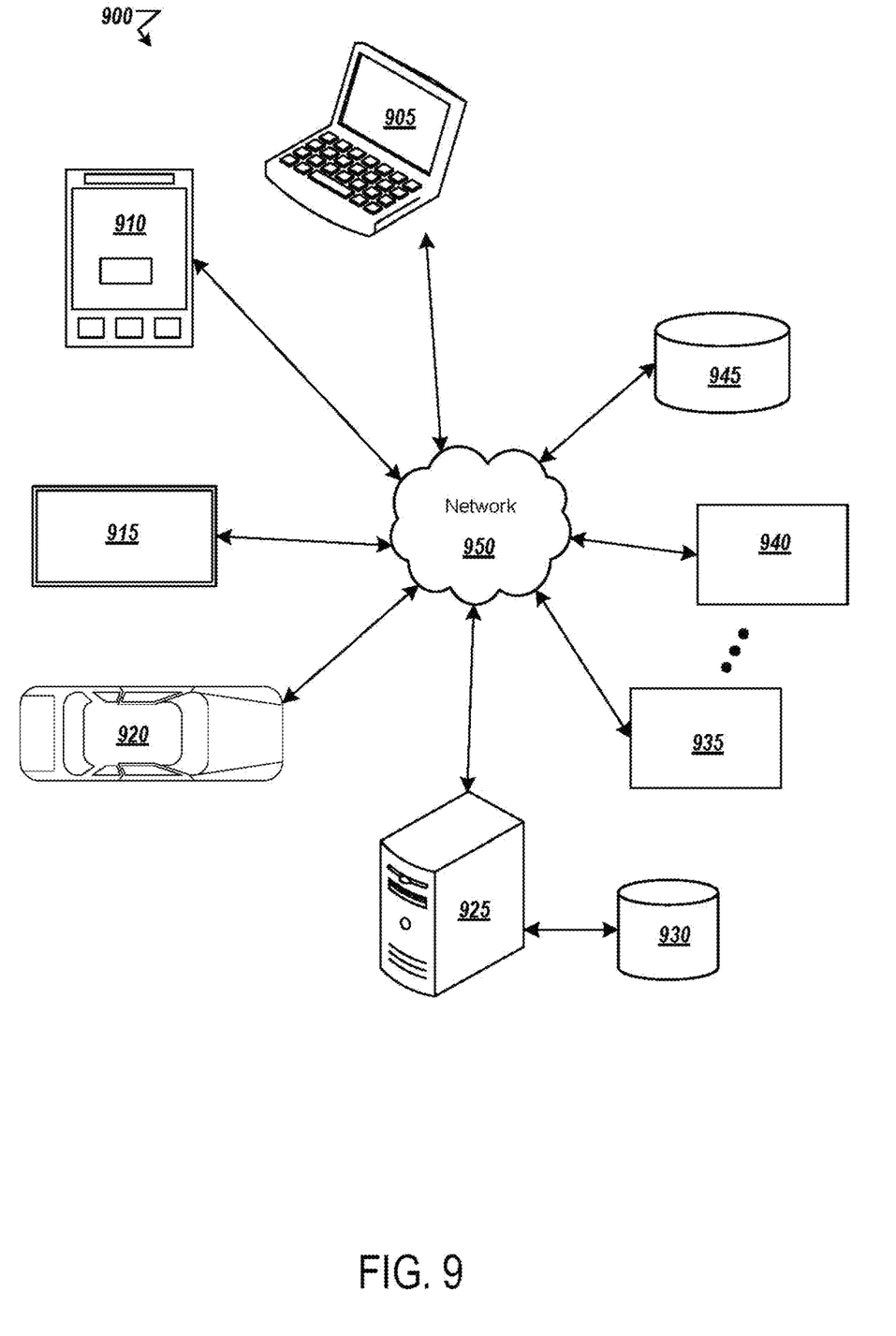
FIG. 9 illustrates a system including a processor according to the example implementations.

FIG. 9 is a functional block diagram of an exemplary operating environment according to the disclosure. An environment 900 can be suitable for some example implementations disclosed herein. Environment 900 includes devices 905-945, and each is communicatively connected to at least one other device via, for example, network 950 (e.g., by wired and/or wireless connections). Some devices may be communicatively connected to one or more storage devices 930 and 945.

An example of one or more devices 904-905 may be computing devices 805 described in FIG. 8, respectively. Devices 905-945 may include, but are not limited to, a computer 905 (e.g., a laptop computing device) having a monitor and an associated webcam as explained above, a mobile device 910 (e.g., smartphone or tablet), a television 915, a device associated with a vehicle 920, a server computer 925, computing devices 935-940, storage devices 930 and 945.

In some implementations, devices 905-920 may be considered user devices associated with the users, who may be remotely obtaining a sensed audio input used as inputs for the foregoing example implementations. In the present example implementations, one or more of these user devices 905-920 may be associated with one or more sensors such as microphones in a phone of a user or a POS device, that can sense information as needed for the present example implementations, as explained above.

The invention claimed is:

1. A computer-implementation method for dataless contextual targeting of online information for an online advertising application, the computer-implemented method comprising:
   automatically crawling, by a processor, an out-of-domain labeled corpus from one or more web sites using a category mapping from a first set of categories to a second set of categories, the first set of categories including site categories derived from the one or more web sites and the second set of categories associated with an advertising taxonomy;
   applying one or more statistical methods, by the processor, to automatically mine representative keywords for the second set of categories from the noisy out-of-domain labeled corpus, the automatic mining of the representative keywords comprising:
      calculating respective first scores capturing a statistical association between keywords of a list of tokens and categories of the second set of categories, the list of tokens generated for each document of the out-of-domain labeled corpus;
      calculating respective second scores between the keywords of the list of tokens and the categories of the second set of categories, the second score based in part on the respective first scores while maximizing keyword diversity among different categories; and
      selecting subsets of keywords of the list of tokens for the categories as the representative keywords for the respective categories based on the respective second scores;
   applying dataless classification learning, by the processor, to induce a text classifier with the automatically mined representative keywords and a collection of unlabeled web pages as input, wherein the text classifier is applied to determine the online information to provide to the online advertising application; and
   facilitating presenting of targeted content, by the processor, for the online advertising application based on an output of the text classifier applied to a target domain.

2. The method of claim 1 wherein labels for the documents of the out-of-domain labeled corpus are obtained by at least one of applying regular expressions on a page uniform resource locator (URL) or by crawling categorized archive pages.

3. The method of claim 1 wherein textual content of the collection of unlabeled web pages is extracted and cleansed with one or more of: downloading hypertext markup language (HTML) source, web page type detection, boilerplate removal, main textual content extraction and language detection.

4. The method of claim 1 wherein the out-of-domain labeled corpus comprises an automatically labeled dataset, and the representative keywords are automatically mined using statistical methods from the automatically labeled dataset.

5. The method of claim 1 wherein the automatically mined representative keywords and unlabeled documents of the target domain are utilized to induce the text classifier to determine the targeted content for presentment via the online advertising application.

6. A computer-implemented system for building contextual targeting models, comprising:
   a scalable and extendable crawler that periodically crawls <category, content> tuples from one or more websites at a low latency; and
   a low-latency database that stores the crawled <category, content> tuples in a manner that facilitates fast writing and reading operations; and
   a data pipeline that streams unlabeled in-domain data to form a dataset that induces dataless classifiers; and
   a pipeline that fetches representative keywords and unlabeled in-domain dataset and trigger training of dataless classifiers, the representative keywords determined by:
      calculating respective first scores capturing a statistical association between keywords of a list of tokens and categories of an advertising content taxonomy, the list of tokens generated for each of the one or more websites,
      calculating respective second scores between the keywords of the list of tokens and the categories of the advertising content taxonomy, the second score based in part on the respective first scores while maximizing keyword diversity among different categories, and
      selecting subsets of keywords of the list of tokens for the categories as the representative keywords for the respective categories based on the respective second scores; and
   a web service to host the induced dataless classifiers and to provide web application programming interfaces (APIs) to one or more end applications; and
   an engine to facilitate presentment of targeted content for the one or more end applications based on an output of the induced dataless classifiers.

7. The system of claim 6 wherein a list of the one or more websites with associated regular expressions and categorized archive pages is updated to support one or more new websites.

8. The system of claim 6 wherein the low-latency database is scalable and configured to store one million or more of the <category, content> tuples and to facilitate fast querying and grouping of documents based on a value of the category.

9. The system of claim 6 wherein an in-domain data stream generated by the data pipeline is processed and transformed with low latency to append to the in-domain dataset.

10. The system of claim 6 wherein the system builds the contextual targeting models using unlabeled documents.

11. The system of claim 6 wherein textual content of a web page is extracted and cleansed with one or more of: downloading hypertext markup language (HTML) source, web page type detection, boilerplate removal, main textual content extraction and language detection.

12. The system of claim 6 wherein the one or more websites comprise an automatically labeled dataset, and the representative keywords are automatically mined using statistical methods from the automatically labeled dataset.

13. The system of claim 6 wherein the representative keywords automatically mined and the representative keywords and unlabeled documents of a target domain are utilized to induce the dataless classifiers to determine the targeted content for presentment via the one or more end applications.

14. The system of claim 6 wherein multiple training tasks can be performed in parallel to induce classifiers with different sets of keywords and datasets.

15. A non-transitory computer-readable medium including executable instructions stored in a storage to be executed on a processor, the instructions comprising:
- automatically crawling an out-of-domain labeled corpus from one or more web sites using a category mapping from a first set of categories to a second set of categories, the first set of categories including site categories derived from the one or more web sites and the second set of categories associated with an advertising taxonomy;
- applying one or more statistical methods to automatically mine representative keywords for the second set of categories from the out-of-domain labeled corpus, the automatic mining of the representative keywords comprising:
  - calculating respective first scores capturing a statistical association between keywords of a list of tokens and categories of the second set of categories, the list of tokens generated for each document of the out-of-domain labeled corpus;
  - calculating respective second scores between the keywords of the list of tokens and the categories of the second set of categories, the second score based in part on the respective first scores while maximizing keyword diversity among different categories; and
  - selecting subsets of keywords of the list of tokens for the categories as the representative keywords for the respective categories based on the respective second scores;
- applying dataless classification learning to induce a text classifier with the automatically mined representative keywords and a collection of unlabeled web pages as input; and
- facilitating presenting of targeted content for an online advertising application based on an output of the text classifier applied to a target domain.

16. The non-transitory computer-readable medium of claim 15 wherein labels for the documents of the out-of-domain labeled corpus are obtained by at least one of applying regular expressions on a page uniform resource locator (URL) or by crawling categorized archive pages.

17. The non-transitory computer-readable medium of claim 15 wherein the textual content of a web page is extracted and cleansed with one or more of: downloading hypertext markup language (HTML) source, web page type detection, boilerplate removal, main textual content extraction and language detection.

18. The non-transitory computer-readable medium of claim 15 wherein the out-of-domain labeled corpus comprises an automatically labeled dataset, and the representative keywords are automatically mined using statistical methods from the automatically labeled dataset.

19. The non-transitory computer-readable medium of claim 15 wherein the automatically mined representative keywords and unlabeled documents of the target domain are utilized to induce the text classifier to determine the targeted content for presentment via the online advertising application.

20. The method of claim 1 wherein the targeted content comprises advertising.

21. The method of claim 1 wherein the first score comprises a modified version of pointwise mutual information score, and the second score comprises a maximal marginal relevance score.

22. The method of claim 1 wherein the modified version of pointwise mutual information score assigns a higher score to a keyword if the keyword has a high term frequency and relevancy to the category, and the maximal marginal relevance score assigns a higher score to a keyword if the keyword is unique to a single category.

23. The method of claim 1 wherein selecting subsets of keywords of the list of tokens for the categories as the representative keywords for the respective categories comprises:
- ranking the keywords for the respective categories based on the respective second scores, and
- wherein the selected subsets of keywords correspond to the highest ranking keywords.

* * * * *